(12) United States Patent
Littlejohn et al.

(10) Patent No.: US 8,967,941 B2
(45) Date of Patent: Mar. 3, 2015

(54) PRESSWARE STOP RAMP AND METHOD FOR USING THE SAME

(75) Inventors: Mark B. Littlejohn, Appleton, WI (US); Eric J. Berg, Appleton, WI (US); Thomas W. Zelinski, Menasha, WI (US); Mircea T. Sofronie, Easton, PA (US)

(73) Assignee: Dixie Consumer Products LLC, Atlanta, GA (US)

( * ) Notice: Subject to any disclaimer, the term of this patent is extended or adjusted under 35 U.S.C. 154(b) by 393 days.

(21) Appl. No.: 12/971,077

(22) Filed: Dec. 17, 2010

(65) Prior Publication Data

US 2011/0150620 A1 Jun. 23, 2011

Related U.S. Application Data

(60) Provisional application No. 61/289,910, filed on Dec. 23, 2009.

(51) Int. Cl.
*B65B 57/20* (2006.01)
*B65B 57/00* (2006.01)
*B65G 47/24* (2006.01)
*B65H 29/66* (2006.01)
*B65H 33/02* (2006.01)
*B65G 47/88* (2006.01)
*B65G 57/16* (2006.01)

(52) U.S. Cl.
CPC ........ *B65G 47/8823* (2013.01); *B65G 47/8815* (2013.01); *B65G 57/165* (2013.01)
USPC .................. 414/788.2; 414/794.4; 198/419.1; 198/463.4

(58) Field of Classification Search
USPC ........ 198/360, 406, 418.9, 419.1, 419.2, 431, 198/452, 462.2, 463.4, 463.5, 463.6; 226/120; 271/182, 183, 216; 414/788.1, 788.2, 788.9, 789, 789.1
See application file for complete search history.

(56) References Cited

U.S. PATENT DOCUMENTS

| | | | | |
|---|---|---|---|---|
| 2,748,917 A | * | 6/1956 | Rawe | 198/418.9 |
| 3,149,834 A | * | 9/1964 | Faeber | 271/256 |
| 3,217,859 A | * | 11/1965 | Bartlo et al. | 198/419.1 |
| 3,752,295 A | * | 8/1973 | Hubbell et al. | 198/459.7 |
| 3,834,288 A | * | 9/1974 | Behrens et al. | 198/418.9 |
| 4,076,114 A | * | 2/1978 | Tokuno | 198/418.9 |
| 4,159,761 A | * | 7/1979 | Egee et al. | 414/788.5 |
| 4,238,024 A | * | 12/1980 | Hirakawa et al. | 198/418.9 |
| 4,270,743 A | * | 6/1981 | Crampton | 270/58.3 |
| 5,100,124 A | * | 3/1992 | Pouliquen | 271/183 |
| 5,129,643 A | * | 7/1992 | Johnson et al. | 271/216 |
| 5,213,189 A | * | 5/1993 | Agnoff | 193/35 A |
| 5,873,448 A | * | 2/1999 | Tsai et al. | 198/360 |
| 6,119,846 A | * | 9/2000 | Dufour et al. | 198/462.2 |
| 6,267,550 B1 | * | 7/2001 | Morgan | 414/798.4 |
| 6,808,361 B1 | * | 10/2004 | Christy et al. | 414/798.7 |
| 7,055,816 B2 | * | 6/2006 | Leu | 271/3.01 |

* cited by examiner

*Primary Examiner* — Gregory Adams
(74) *Attorney, Agent, or Firm* — William W. Letson

(57) ABSTRACT

Pressware stacking systems and methods for using same. The system can include a conveyor for moving pressware in a first direction; a stop ramp at least partially disposed on the conveyor; and a lifter in communication with the stop ramp. The lifter is adapted to move at least a portion of the stop ramp to an inclined position above the conveyor.

30 Claims, 3 Drawing Sheets

PRESSWARE STOP RAMP AND METHOD FOR USING THE SAME

BACKGROUND OF THE INVENTION

1. Field of the Invention

Embodiments of the present disclosure generally relate to pressware stacking systems and methods for using same.

2. Description of the Related Art

In a typical pressware product stacking system, a take-away table or conveyor transfers pressware products from a matched metal forming die to a stacking surface. The system stacks the pressware products on top of each other until each stacking surface contains the desired product count. Then the system transfers a completed stack to a second conveyor that leads to packaging equipment. Meanwhile, the system continues to form products at full production speed. To prevent the loss of products during stack transfer, previous systems are configured to slow or stop the take-away table while advancing the completed stack to the second conveyor. Certain systems employ a vertical stop gate system to prevent products from advancing onto the stacking surface.

Problems with both previous designs have resulted in loss and waste of materials and products. For example, when the system slows or stops the take-away table, a pressware product in one or more lanes of a multi-lane conveyor can advance more rapidly on the conveyor than pressware products in adjacent lanes, thus reaching the stacking surface early. Similarly, a pressware product in one or more lanes can lag behind pressware products in adjacent lanes, causing the pressware product to fall into the stacking surface incorrectly or go missing from the stack entirely while the completed stacks of plates are transferred to the second conveyor. This can result in entire system shutdown and/or require human intervention, as well as damage to the products themselves and thus wasted resources. Additionally, stopping or slowing the take-away table can cause improper product placement earlier in the chain when just formed products ejected from the metal forming die fall improperly into the queue of products lagging or stopped on the take-away table. Improper placement earlier in the chain can consequently result in faulty transfer from the take-away table to the stacking surface and improper nesting within the stack.

With a vertical stop gate system, the system does not decrease the take-away table speed but rather a barrier rotates to form a vertical wall to prevent the pressware products from advancing. While halting the flow of products, the gate can cause physical injury to personnel by trapping or pinching appendages or damage to the products themselves when the wall comes down on top of at least a portion of the product. Damaged products later advanced to a stack can prevent proper stacking, leading to wasted time and/or products. Additionally, the lowered gate can cause product jams on the take-away table once stacking resumes, dislocating the product's proper placement and resulting in a bad stack, as previously mentioned.

There is a need, therefore, for new pressware stacking systems and methods for using same.

SUMMARY OF THE INVENTION

Pressware stacking systems and methods for using same are provided. In at least one specific embodiment, the pressware stacking system can include a conveyor for moving pressware in a first direction; a stop ramp at least partially disposed on the conveyor; and a lifter in communication with the stop ramp. The lifter is adapted to move at least a portion of the stop ramp to an inclined position above the conveyor.

In at least one specific embodiment, the method for using the system includes conveying pressware products in a first direction on a take-away table, wherein the take-away table comprises: at least one conveyor belt; a stop ramp adapted to move in and out of an inclined position above the belt; and a lifter in communication with the stop ramp, wherein the lifter is adapted to move at least a portion of the stop ramp to the inclined position. The stop ramp can be actuated to the inclined position to impede the conveyance of the pressware products so that the pressware products can be shingled on at least a portion of the stop ramp. The stop ramp can be reclined to continue conveying the pressware products in the first direction; and the shingled pressware products can be stacked and ready for packaging.

BRIEF DESCRIPTION OF THE DRAWINGS

So that the recited features can be understood in detail, a more particular description of various exemplary embodiments of the invention, briefly summarized above, can be had by reference to one or more embodiments, some of which are illustrated in the appended drawings. It is to be noted, however, that the appended drawings illustrate only typical embodiments and are therefore not to be considered limiting of its scope, for the invention can admit to other equally effective embodiments. It is emphasized that, in accordance with the standard practice in the industry, various features are not drawn to scale. In fact, the dimensions of the various features can be arbitrarily increased or reduced for clarity of discussion.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
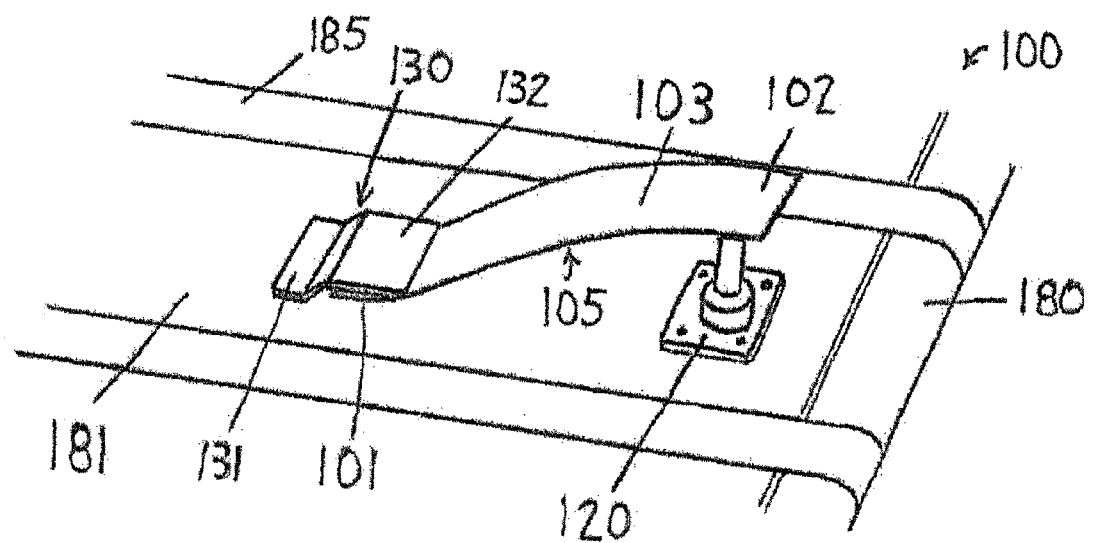
FIG. 1 depicts a schematic of an illustrative pressware stacking system having a stop ramp, according to one or more embodiments described.

FIG. 1 depicts a schematic of an illustrative pressware stacking system 100 having a stop ramp 105, according to one or more embodiments described. The stop ramp 105 can be at least partially disposed on a conveyor or take-away table 180. The take-away table 180 can include an upper surface 181 and one or more moving belts (two are shown) 185 for moving pressware in at least one direction, such as the machine direction which is illustrated in FIG. 1 from the left to right side of the page.

The stop ramp 105 can include a body 103 having a first end 101 and a second end 102. While body 103 is typically generally planar, in other embodiments if clearance is when in a lowered position, body may be curved or have multiples bends therein. The first end 101 of the stop ramp 105 can be affixed to a support or trap 130, or the first end 101 can be affixed directly to the take-away table 180. A lifter or lift mechanism 120 can be in communication with the body 103. As illustrated in FIG. 1, the lifter 120 can be adapted to move at least one end 101, 102 of the body 103 so that the body 103 is moved with relation to the table 180. For example, the lifter 120 can be adapted to displace the second end 102 of the body 103 from a first or "lowered" position to a second or "raised" position so that at least a portion of the body 103 provides an inclined surface relative to the surface 181 of the table 180. The lifter 120 can be actuated and or driven pneumatically, hydraulically, electrically, mechanically, manually, or by a combination thereof. For example, the lifter 120 can be or include one or more air cylinders located below the body 103 of the stop ramp 105. The lifter 120 can also be directly attached to the second end 102 of the body 103.

The body 103 can be displaced or moved away from the surface 181 of the take-away table 180 a distance ranging from a low of about 0.25 cm, about 1 cm, about 2 cm, about 3 cm, or about 4 cm to a high of about 5 cm, about 8 cm, about 10 cm, about 12 cm, or about 15 cm. For example, the second end 102 can have a displacement from the surface 181 of take-away table 180 ranging from about 0.5 cm to about 14 cm, about 1.5 cm to about 13.5 cm, or about 2.5 cm to about 13 cm. In another example, the second end 102 can have a displacement from the surface 181 of take-away table 180 of about 4.5 cm. Accordingly, the raised position of the body 103 can be transverse or oblique to the first direction of the take-away table 180.

As mentioned above, the support or trap 130 can be at least partially disposed about one end 101 or 102 of the body 103. At least a portion of the trap 130 can be fixed directly to the take-away table 180 or directly to its upper surface 181. For example, the trap 130 can have a first end 131 fixed to the surface 181 of the take-away table 180, and a second end 132 that is displace therefrom and adapted to receive at least a portion of the body 103. In another embodiment, the trap 130 can be recessed below the belt(s) 185 or recessed below the surface 181 of the take-away table 180 so that the trap 130 can have a maximum displacement from the surface 181 that is less than the displacement of the conveyor belt 185 from the take-away table 180 or less than the thickness of the conveyor belt 185. This displacement can allow products or objects transported on the take-away table 180 to move freely above the trap 130. Any suitable fastener can be used to attach or otherwise affix the trap 130 to the take-away table 180 or its upper surface 181. For example, suitable fasteners can include, but are not limited to, one or more bolts, nails, screws, pegs, slots, hooks, rivets, glue, Velcro, epoxy, adhesive, welding, soldering, and/or brazing. The trap 130 can also be molded or formed with the take-away table 180 as one component.

The trap 130 is intended to at least partially cover and protect at least the first end 101 of the body 103 of the stop ramp 105. Because the second end 132 of the trap 130 is "open" and displaced from the surface 181 of the table 180, the first end 101 can be adapted to move, slide, or translate in a linear direction relative to the trap 130. The first end 101 can also be adapted to move in another direction relative to the linear direction of the trap 130, including a direction that is transverse or oblique to the linear direction. During actuation of the second end 102 of the body 103, the first end 101, having been slidably mounted within the trap 130, can move underneath the end 132 of the trap 130 whereby the trap 130 and the second end 132 thereof limit the motion of the first end 101. Accordingly, the slidably mounted first end 101 can slide parallel to the direction of movement of pressware products on the take-away table 180, and/or the slidably mounted first end 101 can slide in a direction oblique or transverse to the direction of movement of pressware products on the take-away table 180.

The body 103 of the stop ramp 105 can be configured to bend or otherwise flex, and yet maintain rigidity. In one embodiment, the body 103 can be completely rigid. In another embodiment, the body 103 can be made of a flexible material capable of bending or flexing upon an applied force and returning to its original shape. Such suitable materials include but are not limited to any one or more metals (such as aluminum, steel, stainless steel, brass, nickel), fiberglass, wood, composite materials (such as ceramics, wood/polymer blends, cloth/polymer blends, etc.), and plastics (such as polyethylene, polypropylene, polystyrene, polyurethane, polyethylethylketone (PEEK), polytetrafluoroethylene (PTFE), polyamide resins (such as nylon 6 (N6), nylon 66 (N66)), polyester resins (such as polybutylene terephthalate (PBT), polyethylene terephthalate (PET), polyethylene isophthalate (PEI), PET/PEI copolymer) polynitrile resins (such as polyacrylonitrile (PAN), polymethacrylonitrile, acrylonitrile-styrene copolymers (AS), methacrylonitrile-styrene copolymers, methacrylonitrile-styrene-butadiene copolymers; and acrylonitrile-butadiene-styrene (ABS)), polymethacrylate resins (such as polymethyl methacrylate and polyethylacrylate), cellulose resins (such as cellulose acetate and cellulose acetate butyrate); polyimide resins (such as aromatic polyimides), polycarbonates (PC), elastomers (such as ethylene-propylene rubber (EPR), ethylene propylene-diene monomer rubber (EPDM), styrenic block copolymers (SBC), polyisobutylene (PIB), butyl rubber, neoprene rubber, halobutyl rubber and the like)), as well as mixtures, blends, and copolymers of any and all of the foregoing materials.

The stop ramp 105 can be positioned to not interfere with the at least one moving conveyor belt 185 when the ramp moves from the lowered position to the raised position. As depicted in FIG. 1, the stop ramp 105 can be interposed between the two or more conveyor belts 185. The stop ramp 105 can be equidistant between two parallel conveyor belts 185 or arranged "off-center." In an embodiment, multiple stop ramps 105 can be disposed between and/or adjacent a plurality of conveyor belts 185. For example, two or more stop ramps 105 can be place between two conveyor belts 185.

The take-away table 180 can be any apparatus that conveys, conducts, translocates, or transports pressware products. The take-away table 180 can be or include a conveyor belt, a chain, a robotic arm, a pulley system, and/or any combination thereof. Each location can be vertically separated, horizontally separated, or any combination of angles therebetween. The take-away table 180 can be flat, or substantially flat. The take-away table 180 can be horizontal or substantially horizontal. The take-away table 180 can also be inclined or declined, such as about 5 to about 45 degrees, relative to the horizontal. Further, the take-away table 180 can have multiple lanes or belts 185 separated by one or more dividers. For example, the take-away table 180 can have of from 2 to 20 lanes, 3 to 15 lanes, or 4 to 10 lanes, each separated by one or more dividers to convey or transport pressware product or a plurality of pressware products.

The conveyor belt(s) 185 can be a high friction belt as is commonly used in the art for conveying pressware. The conveyor belt 185 can have any thickness. For example, the belt thickness can vary from a low of about 0.05 cm, about 0.1 cm, about 0.25 cm, or about 0.5 cm to a high of about 1 cm, about 1.5 cm, about 2 cm, about 2.5 cm, or about 3 cm. The belt thickness can also range from about 0.075 cm to about 2.75 cm, about 0.15 cm to about 2.25 cm, or about 0.2 cm to about 1.75 cm.

Figure 2:
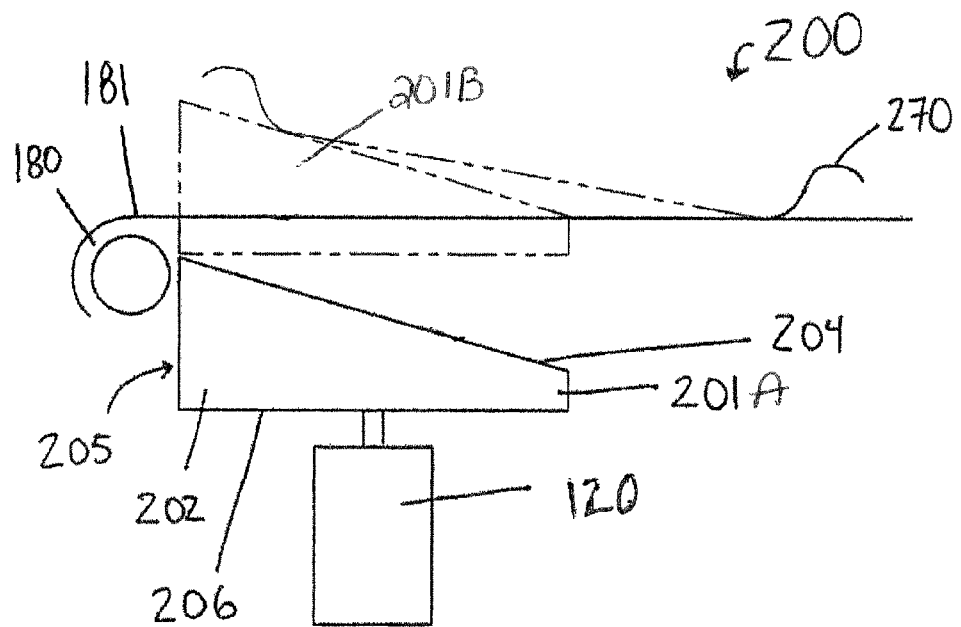
FIG. 2 depicts a schematic of another illustrative pressware stacking system having a stop ramp, according to one or more embodiments described.

FIG. 2 depicts a schematic of another illustrative pressware stacking system 200 having a stop ramp 205, according to one or more embodiments described. The stop ramp 205 can be wedge shaped as depicted in FIG. 2. The wedge shaped ramp 205 can have a first ("upper") surface 204 that is angled with respect to a second ("lower") surface 206. The second surface 206 can be planar or substantially planar. The angle between the first surface 204 and the second generally planar surface 206 can be acute, and can range from a low of about 5, 10, or 15 degrees to a high of about 30, 40, or 55 degrees.

The stacking system 200 can further include the lifter 120 and take-away table 180 with upper surface 181, as described above with reference to FIG. 1. As shown in FIG. 2, the lifter 120 can move the stop ramp 205 from a first position ("lower position") 201A to a second position ("raised position") 201B to move or lift a pressware product 270 at an angle with respect to the upper surface 181 of the table 180. The angle of the pressware product 270 with respect to the surface 181 of the take-away table 180 can vary from a low of about 2 degrees, about 5 degrees, about 10 degrees, or about 15 degrees to a high of about 20 degrees, about 25 degrees, about 30 degrees, about 35 degrees, about 40 degrees, about 45 degrees, about 50 degrees, about 55 degrees, or about 60 degrees, and is dependent on the height of the lifter 120 and the slope of the upper surface 204 of the stop ramp 205. For example, the angle of the pressware product 270 with respect to the surface 181 of the take-away table 180 can range from about 3 degrees to about 36 degrees, about 7.5 degrees to about 42 degrees, from about 12 degrees to about 48 degrees. In another example, the angle of the pressware product 270 can be about 18 degrees from the surface 181 of take-away table 180. As used herein, the term "pressware product" refers to one or more bowls, cups, plates, containers, trays, platters, deep dishes, and/or fluted products.

Figure 3:
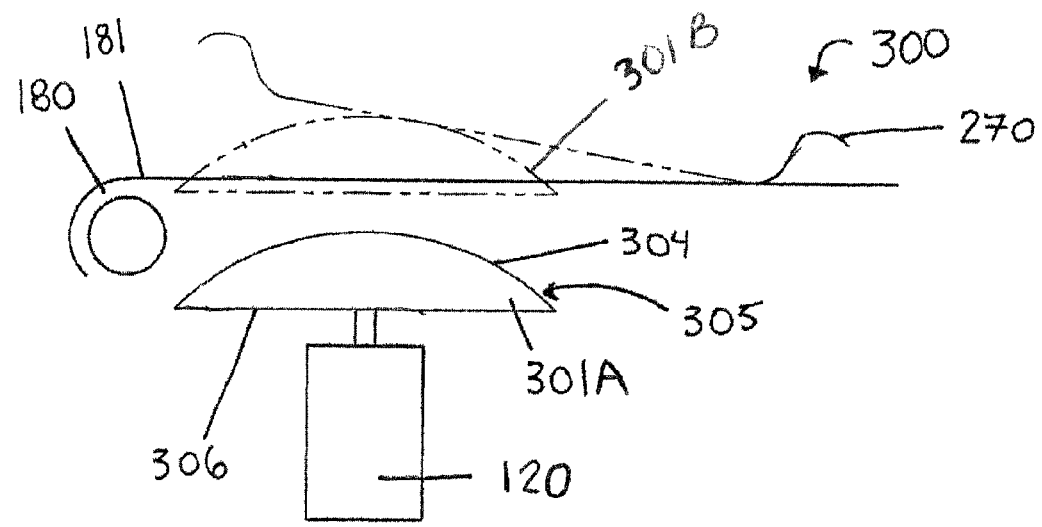
FIG. 3 depicts a schematic of yet another illustrative pressware stacking system having a stop ramp, according to one or more embodiments described.

FIG. 3 depicts a schematic of yet another illustrative pressware stacking system 300 having a stop ramp 305, according to one or more embodiments described. The stop ramp 305 can have a curved upper portion or surface 304 and a generally planar lower portion or surface 306. When the stop ramp 305 is lifted or actuated by the lifter 120 from a first position 301A to a second position 301B, the curvature of the upper surface 304 can contact the pressware product 270, thereby moving the pressware product 270 to an angle with respect to the surface 181 of the take-away table 180. In this embodiment, the curvature of the upper surface 304 of the stop ramp 305 determines the angle of displacement or the height of displacement of the pressware 270 from the surface 181 of the table 180.

Figure 4:
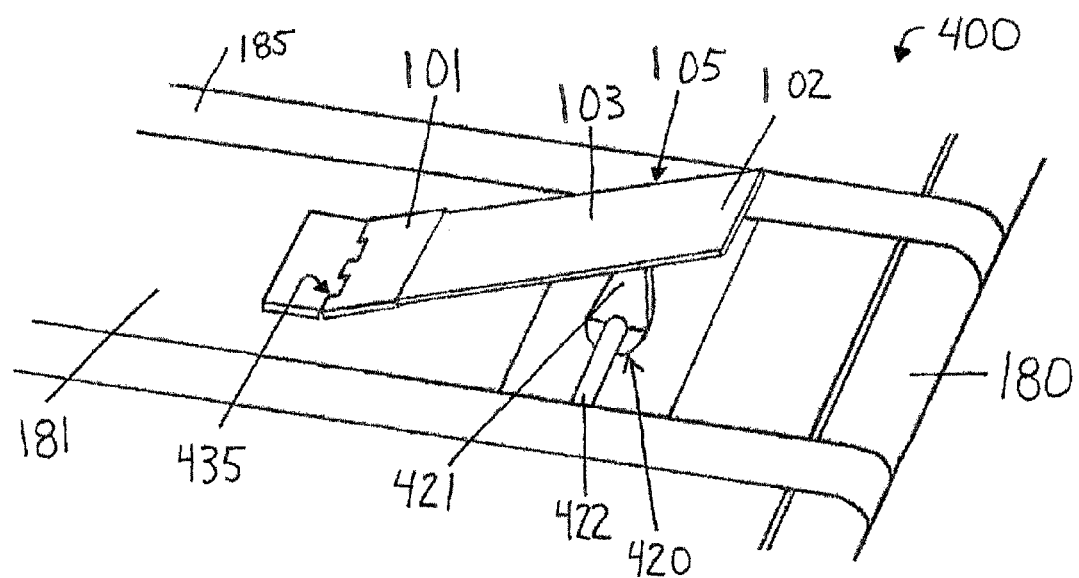
FIG. 4 depicts a schematic of yet another illustrative pressware stacking system having a stop ramp, according to one or more embodiments described.

FIG. 4 depicts a schematic of yet another illustrative pressware stacking system 400 having a stop ramp 405, according to one or more embodiments described. In this embodiment, the trap 130 can be pivotable using a hinge 435 disposed between its first end 131 and second end 132. In an embodiment, the hinge 435 can be a separate component welded or otherwise attached between the ends 131, 132 of the trap, or the hinge 435 can be a "living hinge" integral with the trap 130. In operation, the first end 401 of the body 403 of the stop ramp 405 can be moved rotationally through the help of the hinge 435 upon movement of the stop ramp 405.

The hinge 435 can be used in conjunction with the lifter 120 and/or with any of the stop ramps 105, 205, 305, described and depicted above with reference to FIGS. 1-3. The hinge 435 can also be used with a lifter 420 having at least one rotatable component 421 as depicted in FIG. 4. The rotatable component 421 can be attached or otherwise disposed on a rotatable shaft 422 and adapted to contact the body 403 of the stop ramp 405. The rotatable component 421 can be an oblong structure as depicted in FIG. 4. For example, the rotatable component 421 can include tapered or converging sides to provide an angled surface for the displacement of the stop ramp 405. The shaft 422 can be located below the take-away table 180 so that the rotatable component 421 maintains a clearance beneath the upper surface 181 of the table 180 while providing a sufficient displacement of the stop ramp 405. The size or length of the rotatable component 421 can vary but should be sufficient to move, displace, push, and/or maintain the second end 402 of the body 403 at a desired distance and/or height so that the body 403 of the stop ramp 405 can be positioned at the desired angle, described above, with respect to the surface 181 of the take-away table 180.

Figure 5:
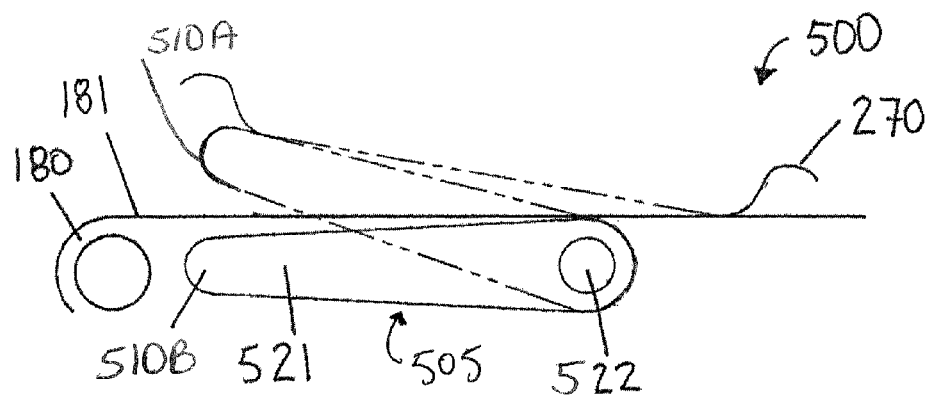
FIG. 5 depicts a schematic of still yet another illustrative pressware stacking system having a stop ramp, according to one or more embodiments described.

FIG. 5 depicts a schematic of still yet another illustrative pressware stacking system 500 having a stop ramp 505, according to one or more embodiments described. The stop ramp 505 can include a body 521 that is placed about a rotatable shaft 522. The body 521 can be an elongated member or finger that swings up (position 510A) and down (position 510B) by rotation of the shaft 522. When the stop ramp 505 is actuated, the body 521 can be rotated by the shaft 522 to contact the pressware product 270, thereby moving the pressware product 270 to an angle with respect to the surface 181 of the take-away table 180.

Figure 6:
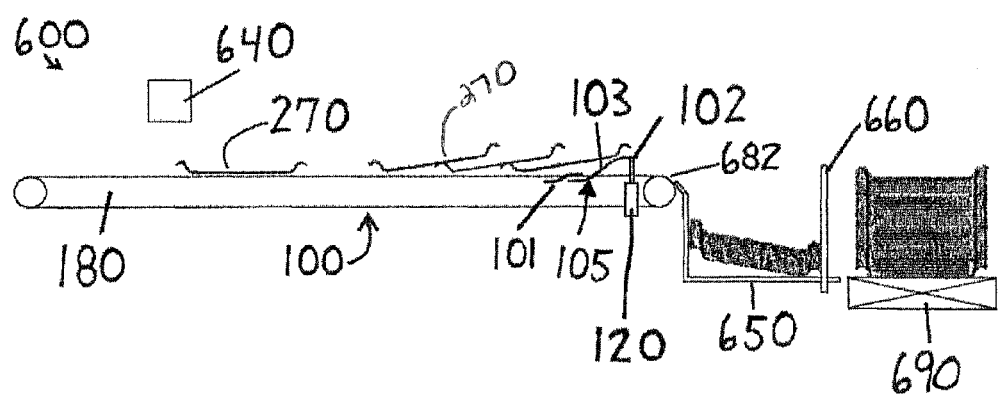
FIG. 6 depicts a schematic of an illustrative pressware stacking system, according to one or more embodiments described.

FIG. 6 depicts a schematic of an illustrative pressware stacking system 600, according to one or more embodiments described. The stacking system 600 can include one or more counter systems 640, one or more surfaces for staking pressware or stacking cans 650, one or more take-away tables 180, and a second conveyor system 690. The pressware stacking system 600 can further include any one of the stop ramps 105, 205, 305, 405, 505 and lifters 120, 420, described above with reference to FIGS. 1-5. For simplicity and ease of description, however, the stacking system 600 will be further described with reference to the stop ramp 105 described above with reference to FIG. 1.

The stop ramp 105 can be located toward a terminating end 682 of the table 180, and can be oriented such that the second end 102 of the body 103 is closer to the terminating end 682 than the first end 101 of the body 103. Locating the stop ramp 105 near the terminating end 682 can help stop any lagging pressware products 270 still on the take-away table 180 and can prevent the pressware products 270 from backing up.

The surface 650 for stacking the pressware products 270 can also be located adjacent the terminating end 682 of the take-away table 180. The stacking surface 650 can be recessed adjacent and/or beneath the take-away table 180. The stacking surface 650 can hold a completed stack of pressware products 270. The stacking surface 650 can be horizontal, but can also be disposed at any other angle from the horizontal. The pressware products 270 can be stacked on the stacking surface 650 at any angle. Different pressware products 270 can use different angles to obtain optimum stacking. The desired stacking angle can vary from a low of about 2.5 degrees, 5 degrees, and 7.5 degrees to about 10 degrees, 12 degrees, 20 degrees, 25 degrees, 40 degrees, or 45 degrees from the horizontal. For example, the optimum stacking angle can range from 10 degrees to 30 degrees, about 3 degrees to about 35 degrees, or about 5 degrees to about 33 degrees from the horizontal. In another example, the stacking angle can be about 15 degrees.

During operation of the pressware stacking system 600, the pressware products 270 can be formed in a forming die (not shown). The pressware product 270 can be formed or configured in the die into a shape that allows the pressware product 270 to nest or closely fit on top of another when stacked. Once formed, the pressware products 270 can be conveyed or transported one at a time along the take-away table 180 in a first direction towards the stacking surface 650. As the pressware products 270 transfer or drop onto the stacking surface 650, they can form a stack. The stack can be formed by nesting a plurality of pressware products 270, e.g. 2 or more; 5 or more; 10 or more; 20 or more; 50 or more; 100 or more; 200 or more; or 1,000 or more, one on top of another. Although not shown, the pressware products 270 can be formed in multiple forming dies and conveyed along multiple lanes on the take-away table 180 and stacked in multiple stacking surfaces 650. Each lane can have at least one stop ramp 105, which can actuated simultaneously and de-actuated simultaneously, or any pattern or synchronicity.

When the stacking surface 650 is full, a sensor can send a signal to a control board or operator indicating the stacking surface 650 has reached its limit, i.e. the stacking surface 650 contains a completed stack. A stacking surface 650 can be full when the stack of pressware products 270 has reached a predetermined height, when a desired number of pressware products 270 have been stacked, when the stack of pressware products 270 reaches a height equal to the surface of the take-away table 180 or when a final pressware product 270 has been transferred to the stack. The completed stack of pressware products 270 can have a count of about 15 to 175, about 20 to 150, about 25 to 125, about 30 to 100, about 35 to 75, or about 40 to 65 pressware products 270. The counter system 640 can be used to detect the number of pressware products 270 of the stack. The counter system 640 can have a photo eye sensor, a proximity sensor, or a mechanically actuated sensor. The counter system 640 can count each plate that passes the sensor on the take-away table 180. The counter system 640 can also include the jam detector.

The stop ramp 105 can be actuated to a second or "raised" position in response to the completed stack signal. Once the stop ramp 105 has been actuated i.e. inclined or raised, the pressware products 270 can be accumulated or "shingled" on the stop ramp 105, as shown in FIG. 6. When activated, the stop ramp 105 can assume a partial "s-shaped" curve. The partial s-shape can allow orientation of the pressware products 270 at the desired angle for shingling or accumulation of the pressware products 270 while the lifter 120 maintains the raised position. Shingling involves a first pressware product 270 sliding to a halt due to the angle of the body 103 of the stop ramp 105 so as not to completely pass beyond the second end 102 of the body 103 of the stop ramp 105. As the first pressware product 270 comes to a halt on the body 103 of the stop ramp 105, a front end of a second pressware product 270 can partially cover a back end of the first pressware product 270. A front end of a third pressware product 270 can cover a back end of the second pressware product 270 in the same manner, and so on and so forth. Pressware products 270 can be shingled in this way while the completed stack is removed from the stacking surface 650 onto the second conveyor 690. The number of shingled pressware products 270 can vary, depending on the belt speed and the height or capacity of the stacking surface 650, and the number can range, e.g. from 2 to 4; 2 to 5; 2 to 10; or 2 to 20.

Shingling the pressware products 270 using the stop ramp 105 can provide consistent accumulation and result in stacks of pressware products 270 having fewer inverted or damaged products. Using the stop ramp 105 can also result in fewer wasted materials, including scrap from damaged pressware products 270. If the pressware stacking system 600 can minimize wasted pressware products 270, it can increase machine or system productivity, and thus can result in lower packing cost. The stop ramp 105 in the pressware stacking system 600 can also help to minimize jamming of the pressware products 270 on the take-away table 180, which in turn can allow for a reduction in monitoring personnel.

Still referring to FIG. 6, once the stop ramp 105 has been actuated, the belt 185 (shown in FIG. 1) of the table 180 does not need to slow or come to a stop. The speed of the conveyor belt 185 can be optimized to minimize changes to the speed of the conveyer belt 185 and/or a speed of the pressware product 270 advancement. The speed of the conveyor belt 185 can also be optimized to allow for proper accumulation of the pressware products 270 during the actuation of the stop ramp 105 to the second or "raised" position and for regular conveyance of the pressware products 270 when the stop ramp 105 is de-actuated to a first or "lowered" position. The pressware products 270 can be conducted along the take-away table 180 at substantially constant speed or rate of advancement. The speed or rate of advancement can range from a low of about 0.05 m/s, about 0.2 m/s, about 0.35 m/s, about 0.5 m/s to a high of about 0.7 m/s, about 0.8 m/s, about 0.9 m/s, about 1 m/s. For example, the speed or rate of advancement can range from about 0.1 m/s to about 0.95 m/s, about 0.15 m/s to about 0.85 m/s, or about 0.25 m/s to about 0.75 m/s. In another example, the speed or rate of advancement can be about 0.3 meters/second. In one embodiment, pressware products 270 maintain their substantially constant speed of translocation on the conveyor belt 185 while stop ramp 105 is actuated. Use of a pressware stacking system 600 in a pressware product 270 stacking system can decrease the system's sensitivity to the timing of ejection of pressware products 270 from the forming die, the speed of the conveyer belt 185, and/or rate of pressware product 270 advancement.

The stacking surface 650 can be bounded by at least one retractable pin 660 and by at least one side guide plate (not shown) to help position pressware products 270 on top of each other during stacking. The second conveyor 690 can be located at the end of the stacking surface 650. A completed stack can be released and removed from the stacking surface 650 by lowering the at least one retractable stop pin 660. The stack can then be advanced onto the second conveyor 690 or onto a holding area (not shown) by a mechanically, hydraulically, pneumatically, and/or electronically actuated arm, lever, and/or post. In one embodiment, there can be two retractable stop pins 660. In another embodiment, there can be three retractable stop pins 660. In a multilane system (not shown), the stacking surface 650 can have at least one retractable stop pin 660 for each corresponding lane of the system.

The stop pin or pins 660 can be displaced prior to pushing and/or removing the completed stack from the stacking surface 650 onto the second conveyor 690 or onto the holding area (not shown). The retractable pin or pins 660 can be vertical or angled away from the take-away table 180 to aid in formation of the stack. In one embodiment, the angle of the retractable pin or pins 660 can vary from a low of about 2 degrees, 5 degrees, and 7.5 degrees to about 10 degrees, 12 degrees, 15 degrees, 25 degrees, 30 degrees, or 45 degrees from vertical. For example, the angle of the retractable pin 660 can range from 2.5 degrees to 20 degrees, about 3 degrees to about 18 degrees, or about 5 degrees to about 40 degrees from vertical. In another example, the angle of the retractable pin or pins 660 can be about 15 degrees from vertical.

Once a completed stack has been removed to the second conveyor 690 or the holding area (not shown), the stop ramp 105 can be de-actuated or actuated to a lowered position. The shingled pressware products 270 can then advance as a group in their shingled formation towards the stacking surface 650. The group of shingled pressware products 270 can then fall onto the stacking surface 650 in an orderly fashion. As the group of shingled pressware products 270 reaches the edge of the take-away table 180, the first pressware product 270 having at least a second pressware product 270 shingled thereupon, can fall onto the stacking surface first. The first pressware product 270 can at least partially contact the second pressware product 270 as it falls. The second pressware product 270 can then fall on the first pressware product 270 and can form the stack. The pressware products 270 can then be stacked in this way without inverting or improperly displacing pressware products 270. The process of transferring the pressware products 270 into the stacking surface 650 resumes until the stacking surface 650 has a completed stack once again.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow. In the foregoing discussion and in the claims, the terms "including" and "comprising" are used in an open-ended fashion, and thus should be interpreted to mean "including, but not limited to."

What is claimed is:

1. A pressware stacking system, comprising:
    a conveyor having a first end and a second end, the conveyor adapted to move pressware from the first end to the second end;
    a stop ramp at least partially disposed on the conveyor adjacent the second end of the conveyor;
    a trap having a first end fixed to the conveyer and a second end at least partially covering a first end of the stop ramp;
    a hinge disposed between the first and second ends of the trap;
    a lifter in communication with a second end of the stop ramp, wherein the lifter is adapted to move the second end of the stop ramp to an inclined position above the conveyor; and
    a surface for stacking the pressware into a nested stack, wherein the surface is below the conveyor and adjacent the second end of the conveyor.

2. The system of claim 1, wherein the lifter is mechanically, pneumatically, electronically, or hydraulically actuated.

3. The system of claim 1, wherein the lifter is disposed between the first end and the second end of the conveyor.

4. The system of claim 1, wherein the stop ramp is disposed between the first end and the second end of the conveyor.

5. A pressware stacking system, comprising:
    a conveyor having a first end and a second end, the conveyor adapted to move pressware from the first end to the second end;
    a stop ramp adjacent the second end of the conveyor, wherein the stop ramp is a wedge shaped member having a sloped upper surface that is inclined with respect to the conveyor;
    a lifter in communication with the stop ramp, wherein the lifter is adapted to move at least a portion of the stop ramp to an inclined position above the conveyor; and
    a surface for stacking the pressware into a nested stack, wherein the surface is below the conveyor and adjacent the second end of the conveyor.

6. A pressware stacking system, comprising:
    a conveyor having a first end and a second end, the conveyor adapted to move pressware from the first end to the second end;
    a stop ramp adjacent the second end of the conveyor, wherein the stop ramp has a curved upper portion to provide an inclined surface with respect to the conveyor;
    a lifter in communication with the stop ramp, wherein the lifter is adapted to move at least a portion of the stop ramp to an inclined position above the conveyor; and
    a surface for stacking the pressware into a nested stack, wherein the surface is below the conveyor and adjacent the second end of the conveyor.

7. The system of claim 6, wherein the lifter is disposed between the first end and the second end of the conveyor.

8. The system of claim 6, wherein the stop ramp is disposed between the first end and the second end of the conveyor.

9. A pressware stacking system, comprising:
    a conveyor having a first end and a second end, the conveyor adapted to move pressware from the first end to the second end;
    a stop ramp adjacent the second end of the conveyor;
    a lifter in communication with the stop ramp, wherein the lifter comprises at least one rotatable component adapted to move at least a portion of the stop ramp to an inclined position above the conveyor; and
    a surface for stacking the pressware into a nested stack, wherein the surface is below the conveyor and adjacent the second end of the conveyor.

10. The system of claim 9, wherein the stop ramp is an elongated member.

11. The system of claim 9, wherein the stop ramp is an elongated member and the lifter is a rotatable shaft configured to rotate the stop ramp to the inclined position.

12. A method for manufacturing pressware, comprising:
conveying pressware products on a take-away table from a first end thereof to a second end thereof, wherein the take-away table comprises:
at least one conveyor belt;
a stop ramp adapted to move in and out of an inclined position above the belt, wherein the stop ramp is adjacent the second end of the take-away table; and
a lifter in communication with the stop ramp, wherein the lifter is adapted to move at least a portion of the stop ramp to the inclined position;
actuating the stop ramp to the inclined position to impede the conveyance of the pressware products;
shingling the pressware products on at least a portion of the stop ramp;
reclining the stop ramp to continue conveying the pressware products; and
stacking the shingled pressware products into a nested stack on a surface disposed below the take-away table and adjacent the second end of the take-away table.

13. The method of claim 12, wherein actuating the stop ramp comprises actuating the lifter to move at least one end of the stop ramp above the take-away table.

14. The method of claim 12, wherein reclining the stop ramp comprises returning the stop ramp to the take-away table.

15. The method of claim 12, wherein the stop ramp has a partial "s-shape" when the stop ramp is actuated.

16. The method of claim 12, wherein actuating the stop ramp comprises rotating the lifter with a rotatable shaft to contact the stop ramp.

17. The method of claim 12, wherein conveying pressware products on the take-away table comprises moving the pressware products along the take-away table at a substantially constant speed, and shingling the pressware products on at least a portion of the stop ramp is done at the same speed.

18. A system for manufacturing pressware, comprising:
a take-away table for transporting pressware products from a first end thereof to a second end thereof;
a stop ramp disposed on the take-away table adjacent the second end, wherein the stop ramp comprises:
a generally planar body having a first end and a second end;
a trap having a first end fixed to the take-away table and a second end substantially planar to the take-away table, wherein the second end at least partially covers a first end of the body of the stop ramp;
a lifter in communication with the second end of the body of the stop ramp, wherein the lifter is adapted to move the second end of the body of the stop ramp so that the body provides an inclined surface; and
a surface for stacking the pressware products into a nested stack, wherein the surface is below the take-away table and adjacent the second end of the take-away table.

19. The system of claim 18, wherein the body of the stop ramp is adapted to move parallel to the direction of movement of the pressware products on the take-away table.

20. The system of claim 18, wherein the trap is recessed below a surface of the take-away table.

21. The system of claim 18, wherein the trap further comprises a hinge between the first end and second end of the trap, wherein the body of the stop ramp is connected to the hinge.

22. The system of claim 18, wherein the lifter is mechanically, pneumatically, electronically, or hydraulically actuated.

23. A method for stacking pressware, comprising:
conveying one or more pressware products on a take-away table from a first end thereof to a second end thereof;
transferring the pressware products from the take-away table onto a stacking surface below the take-away table and adjacent the second end of the take-away table;
signaling a completed stack on the stacking surface;
actuating a stop ramp in response to a completed stack signal, wherein the stop ramp is adjacent the second end of the take-away table, and wherein the stop ramp comprises:
a generally planar body; and
a lifter in communication with the body, wherein the lifter is adapted to move at least one end of the body so that the body provides an inclined surface;
shingling the pressware products on the stop ramp while the completed stack is removed from the stacking surface;
de-actuating the stop ramp to continue conveying the shingled pressware products;
directing the shingled pressware products towards the stacking surface; and
stacking the shingled pressware products into a nested stack on the stacking surface.

24. The method of claim 23, wherein actuating the stop ramp comprises actuating the lifter to displace the at least one end of the body away from the take-away table.

25. The method of claim 23, wherein de-actuating the stop ramp comprises returning the body to the take-away table.

26. The method of claim 23, further comprising displacing at least one stop pin disposed on the stacking surface, and removing the completed stack from the stacking surface onto a conveyor.

27. The method of claim 23, wherein signaling a completed stack on the stacking surface comprises detecting a final pressware product of a stack.

28. The method of claim 23, wherein the body of the stop ramp assumes a partial "s-shape" when the stop ramp is actuated.

29. The method of claim 23, wherein the lifter comprises a shaft having at least one finger disposed thereon, and wherein actuating the stop ramp comprises rotating the shaft to cause the finger to move a first end of the body.

30. The method of claim 23, wherein conveying pressware products on the take-away table comprises moving the pressware products along the take-away table at a substantially constant speed, and wherein shingling comprises maintaining the substantially constant speed.

* * * * *